N. PLATT.
Plow.
No. 46,937.
Patented Mar. 21, 1865.
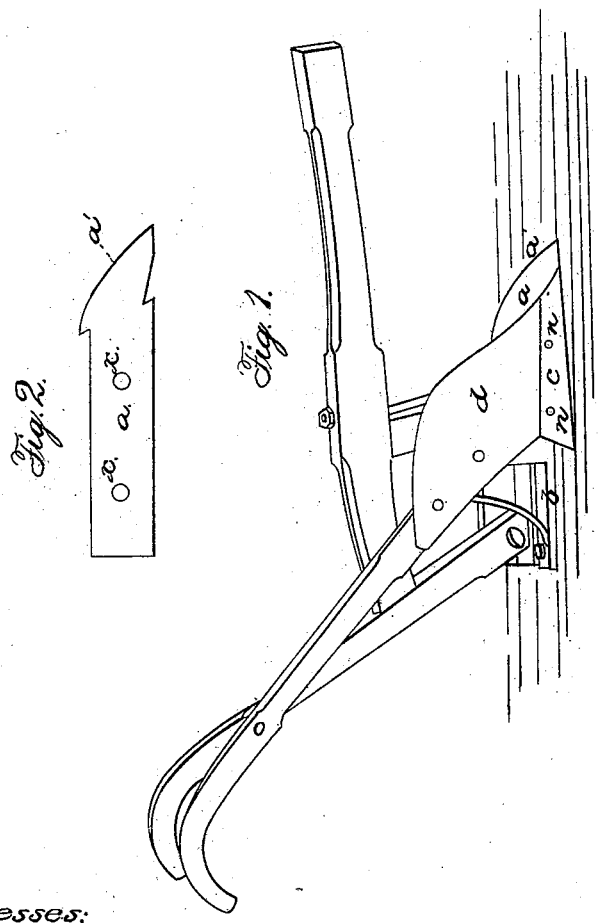

UNITED STATES PATENT OFFICE.

NORMAN PLATT, OF ST. LOUIS, MISSOURI.

IMPROVED PLOW.

Specification forming part of Letters Patent No. 46,937, dated March 21, 1865.

*To all whom it may concern:*

Be it known that I, NORMAN PLATT, of the city and county of St. Louis, and State of Missouri, have invented a new and useful Improvement in Plows; and I do hereby declare that the following is a clear, full, and exact description thereof, reference being had to the accompanying drawings and the letters of reference marked thereon, in which—

Figure 1 is a perspective view of one of the plows. Fig. 2 is a plan of a detached colter belonging to the plow.

The nature of the invention consists in making the colter of the plow in such a manner that it will cut the top crust of the soil from the bottom upward, thereby preventing the old rubbish which may be upon the ground from gathering upon the colter and thereby impeding the progress of the plow.

To enable those skilled in the art to make and use my invention, I will proceed to describe its construction and operation.

The plate $a$, as shown clearly in Fig. 2, is a thin, wide, and long piece of metal, the front edge, $a'$, of which is made of steel; or the whole may be made of steel. There are two or more holes, $x$, made in the plate, through which bolts pass to secure it to the landside of the plow, the bottom edge of the plate being on the same level as the bottom edge of the landside. The line of the front edge, $a'$, of the colter forms, with the line of the bottom edge of it, an angle more or less acute, about forty-five degrees, as may be desired. This arrangement makes the bottom point of the front edge of the colter the most advanced part of it. Consequently it will continually advance below the top crust of the soil, and as the plow advances it will cut upward, thereby causing any obstacles it may meet to slide upward upon it.

The share $c$ of the plow should be made of steel and secured to the mold-board $d$ by means of bolts. The share $c$ and the colter $a'$ may be taken off at pleasure for the purpose of being sharpened.

There is an iron frame, $b$, shown in Fig. 1, which is placed on the mold-board side of the plow and rests on the bottom of the furrow on that side. The use of this frame will keep the plow steady in the furrow and insure the point of the colter being in its proper position in the ground.

Having described my invention, what I desire to secure by Letters Patent is—

The combination of the frame $b$, plate $a$, and colter $a'$, the several parts being constructed and arranged as and for the purpose set forth.

NORMAN PLATT.

Witnesses:
M. RANDOLPH,
A. WAGNER.